United States Patent [19]

Harrington

[11] Patent Number: 4,852,521

[45] Date of Patent: Aug. 1, 1989

[54] AMPHIBIOUS AQUACULTURE FEED DISTRIBUTION MACHINE

[75] Inventor: J. J. Harrington, Twin Falls, Id.

[73] Assignee: Mariculture Equipment Development, Inc., Twin Falls, Id.

[21] Appl. No.: 34,925

[22] Filed: Apr. 6, 1987

[51] Int. Cl.⁴ ............................................. A01K 61/02
[52] U.S. Cl. .................................................. 119/51.04
[58] Field of Search .................... 119/51 R, 52 AF, 3; 114/270; 414/501, 502, 526, 301; 239/146, 171

[56] References Cited

U.S. PATENT DOCUMENTS

| | | | |
|---|---|---|---|
| 2,404,492 | 7/1946 | Hait | 114/270 |
| 2,821,949 | 2/1958 | Uyehara | 114/270 |
| 2,967,056 | 1/1961 | D'Amato | 414/501 X |
| 3,111,399 | 11/1963 | Trom | 414/301 X |
| 3,204,713 | 9/1965 | Shanahan et al. | 114/270 |
| 3,209,925 | 10/1965 | Coenen | 414/301 |
| 3,361,258 | 1/1968 | Kalke | 414/301 X |
| 3,395,672 | 8/1968 | Ruf | 114/270 |
| 3,420,204 | 1/1969 | Samuel | 114/270 |
| 3,426,724 | 2/1969 | Jacobsen | 114/270 |
| 3,428,016 | 2/1969 | Holm | 114/270 |
| 3,450,089 | 6/1969 | Lippincott | 114/270 |
| 3,523,520 | 8/1970 | Evans | 119/51 R |
| 3,543,713 | 12/1970 | Slade | 114/270 |
| 3,895,596 | 7/1975 | Amour | 114/270 |
| 4,157,150 | 6/1979 | Hetrick | 414/502 X |
| 4,372,252 | 2/1983 | Lowry, Jr. | 119/51 R |

FOREIGN PATENT DOCUMENTS

| | | | |
|---|---|---|---|
| 2540794 | 8/1984 | France | 114/270 |
| 410747 | 12/1974 | U.S.S.R. | 119/51 R |
| 648183 | 2/1979 | U.S.S.R. | 119/51 R |
| 0961623 | 9/1982 | U.S.S.R. | 119/51 R |
| 2099113 | 12/1982 | United Kingdom | 114/270 |

Primary Examiner—Robert P. Swiatek
Assistant Examiner—R. Thomas Price
Attorney, Agent, or Firm—Frank J. Dykas

[57] ABSTRACT

An amphibious aquaculture feed and chemical distribution machine for traveling both upon land and water having a storage tank disposed within the amphibious vehicle and an auger for transferring feed from the storage tank up to a drop chute. A drop chute then drops the feed onto a centrifugal distribution fan which disperse the feedstuff or chemicals through the air to the surface of the water. The centrifugal distribution fan includes apparatus for controlling the directional distribution of feedstuff and chemicals.

27 Claims, 12 Drawing Sheets

AMPHIBIOUS AQUACULTURE FEED DISTRIBUTION MACHINE

BACKGROUND OF THE INVENTION

1. Field of Invention

This invention relates to an amphibious aquaculture feeding machine for carrying and efficiently distributing aquaculture feedstuff in large aquaculture ponds. More particularly it relates to an amphibious vehicle having a large feed storage hopper and centrifugal distribution system capable of traveling on land and on water.

2. Description of the Prior Art

Aquaculture is generally defined as the raising of marine life in man made ponds or enclosures. It is a growing and rapidly developing industry world wide. Aquaculture is conducted in both fresh water and salt water environments. It can be generally divided into two sections, having two different focuses. The first is the fish or crustacean hatchery where eggs are accumulated, hatched and the developing fry or larvae are later released into an uncontrolled environment. Examples would include salmon and sport trout hatcheries. The second is the aquaculture for commercial production, such as trout, catfish and shrimp.

In the case of fresh water aquaculture the quantities of water are often limited and as a result the ponds or raceways are small enough that feed distribution can be adequately accomplished by use of a land based apparatus. EVANS, U.S. Pat. No. 3,523,520 discloses such a device.

In the case of salt water aquaculture, or fresh water cat fish and Tilapia ponds, the situation is much different. In particular, in the case of warm water aquaculture for raising shrimp and the like, it is desireable to have large ponds ranging in size from a few acres to over one hundred acres in surface area. These ponds are man made, by enclosing with earthen dikes, large sections of shallow water along a shoreline. These type of salt water ponds can be found around the world, including locations such as the gulf coast of Texas, South America, the Philippine Islands, Southeast Asia, China and Japan.

The feed distribution systems currently in use today are the same as for the smaller fresh water ponds and primarily consist of land based feedstuff blowers and the like which are used to blow feedstuff as far out onto the pond as possible. These feed distribution systems are not suitable or efficient for use with large salt water ponds. Using land based systems, the feed is concentrated near the edges of the pond resulting in the uneven distribution of food wherein little feed reaches the central areas of the pond, and a disproportionately high portion is concentrated near the edges. In such cases the feed is poorly utilized by the animals. This results in cost increases because of wasted feed and declines in production in both the rate of poundage gain and in the total poundage capacity of the pond.

Aquaculture feedstuffs are man made feeds made primarily from small grains and other vegetable matter having suitable protein and other food value content. And, are usually formed into small, fragile, pellets by the use of some binding agent such as molasses. It is pelletized so that it is in a form identifiable by the marine life as food which can be grasped or struck at. But it must also be fragile so that it can be broken apart and ingested. These physical limitations for the feedstuff also create problems for the person attempting to distribute it. The fragile pellets cannot withstand the centrifugal or ballistic forces needed to throw it long distances into the central regions of the pond from a land based unit. Accordingly, what is needed is an apparatus which allows the delivery of the feed to the central areas of the pond. This cannot be accomplished by hand in the case of large ponds because of the amount of feed involved. For example, in a forty-acre shrimp pond, the shrimp are fed every twelve hours and the amount of feed required for each feeding may equal up to 1,000 pounds.

Accordingly, what is needed is an amphibious vehicle capable of carrying large quantities of feed from a remote storage location on land, across the land and poor roads, and into the water for uniform distribution across the surface area of the pond.

SUMMARY OF THE INVENTION

These objectives are accomplished by the use of an amphibious aquaculture feed distribution vehicle which has a large capacity feed hopper and a relatively high ground speed which enable the operator to efficiently transport feed from a central storage area to ponds some distance away. One man is needed to operate the apparatus. The amphibious vehicle drives like a caterpillar tractor on land with dual lever steering and brakes, and has a foot throttle. In water, the amphibious vehicle handles like an inboard motor boat with dual lever steering and a hand operated throttle.

Vehicle propulsion on land is accomplished by three large tires on each side, that are chain driven, one to another. Power is provided through a chain reduction assembly off a differential drive which is connected to a transmission. Braking and steering are accomplished through the use of hydraulic brake assemblies on each side.

Water propulsion is accomplished by means of a jet pump driven off the same engine. Water for the jet drive is taken in through an enlarged perforated metal screen.

The vehicle is designed to operate in a very hostile salt water environment. The hull and all exposed components, where it is possible, are made of stainless steel or aluminum. For those components where it is not cost efficient or possible to have them fabricated of stainless steel or aluminum, the metal parts are galvanized for corrosion resistance.

Power is supplied to all mechanical operations of the vehicle by means of an internal combustion engine, either gas or diesel. The transmission is automatic type. The output shaft provides power from the engine through a differential to the wheels. Cooling for the internal combustion engine is provided by a standard design radiator mounted forward of the engine. Hydraulic power is provided by means of a hydraulic pump powered by the internal combustion engine.

Buoyancy is obtained by displacement of water, chiefly by the main hull of the vehicle. Additional flotation and stability are provided by two side flotation tanks.

Ground propulsion is accomplished by means of six tires, three on each side. Each wheel is mounted on a stainless steel shaft that enters the lower side of the vehicle hull through a multiple clipper sealed bearing housing. The shaft then enters a stainless steel channel shaped frame member that supports the shaft by way of roller thrust bearing blocks. Power is supplied to the shaft by means of a roller chain and sprocket from the shaft of the adjacent wheel. Power is supplied to all of the wheels on each side, serially, by means of a spur gear and drive assembly.

Two braking levers are provided at the operator's work station and positioned for convenient use for controlling the vehicle. On land, to turn the vehicle to the left, the operator pulls back on the left braking lever, thereby actuating the left brake hydraulic master cylinder which is hydraulically connected to the left output shaft brake. When braking forces are applied, the left side wheels will be slowed, and the vehicle will skid around to the left. In a similar manner the operator can turn to the right by pulling back the right braking lever. To slow the vehicle, the operator pulls back on both braking levers simultaneously.

Water propulsion is accomplished by means of a directionally controlled jet pump. The jet pump draws in water through a large perforated metal screen which reduces the suction vacuum per square inch to a level where it will not damage marine life, which may come up against it. Directional control is accomplished by means of a pivot on the pump outlet controlled by a cable attached to the braking levers at a ninety degree orientation to that of the braking controls. As previously stated, the operator pulls back and pushes forward on the braking handles for directional control in the land propulsion mode. In water propulsion mode, the directional control is maintained by lateral motion of the same levers. Pushing the levers to the left will pivot the output nozzle of the jet pump, causing the vehicle to turn to the left. Similarly, pushing the levers to the right will cause a rotation of the jet pump output nozzle, thereby turning the vehicle to the right.

Feed is carried in a main feed tank. It is loaded into the tank either from bags, or, more conveniently, by driving the vehicle under the outlet of a bulk storage tank and dumping the feed directly into the feed tank.

Feed is removed from the tank by means of an auger and dumped into a discharge chute which drops it onto one or more centrifugal fan distributor(s) located at the rear of the vehicle. When in operation the fan distributors accelerate the feed smoothly from a central location on the fan to the edge by means of nylon distributor bars. The feed is thrown up and out of the rear and sides of the vehicle. The pattern of feed distribution can be changed by altering the drop point of the feed onto the rotary distributors. A control system is provided for starting, stopping and controlling the speed of the auger from the operator control position.

The operator sits on a seat on the control tower station at an elevation sufficient to allow an unobstructed 360 degree view. In front of the operator is a control panel housing which contains gages for monitoring engine condition and performance, a speedometer, light switches, and mechanical and hydraulic controls necessary for operation of the feed distribution system. In front of the operator, emerging from the floor on either side of the driver and the control panel are the braking/steering levers. On the floor in a conventional location is the accelerator pedal for the engine.

Two types of engine throttle controls are provided. The first is a conventional spring loaded foot operated gas pedal for use when traveling on land. In the water, when a constant throttle setting is desireable, a lockable hand throttle is provided on the control panel.

DETAILED DESCRIPTION OF PREFERRED EMBODIMENT

Figure 1:
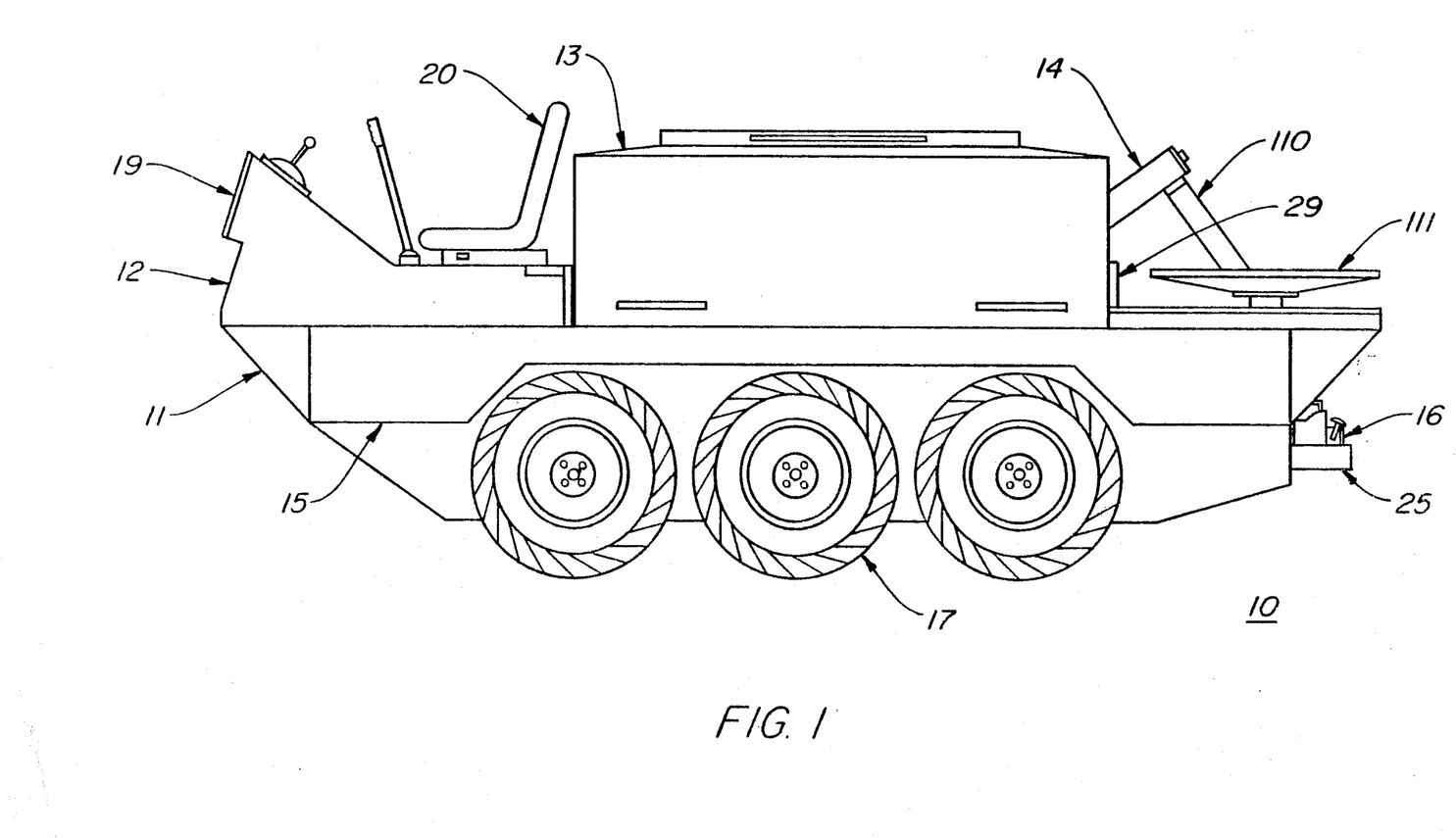
FIG. 1 is a side view showing my new invention.
Figure 2:
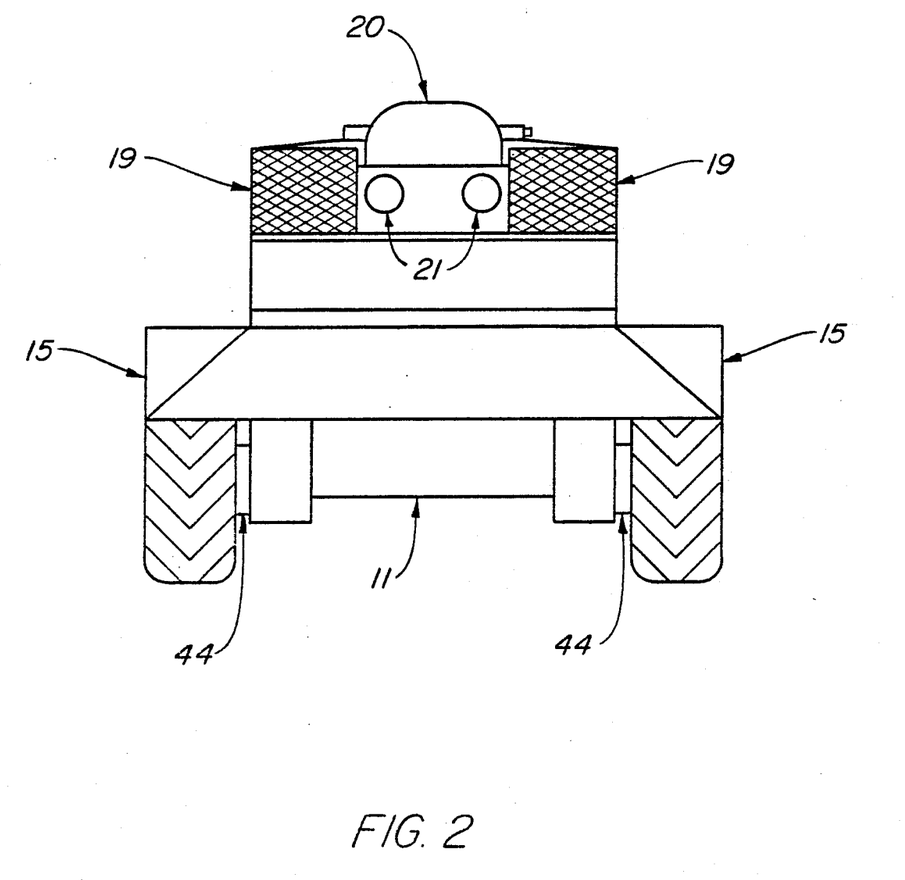
FIG. 2 is a front view.
Figure 3:
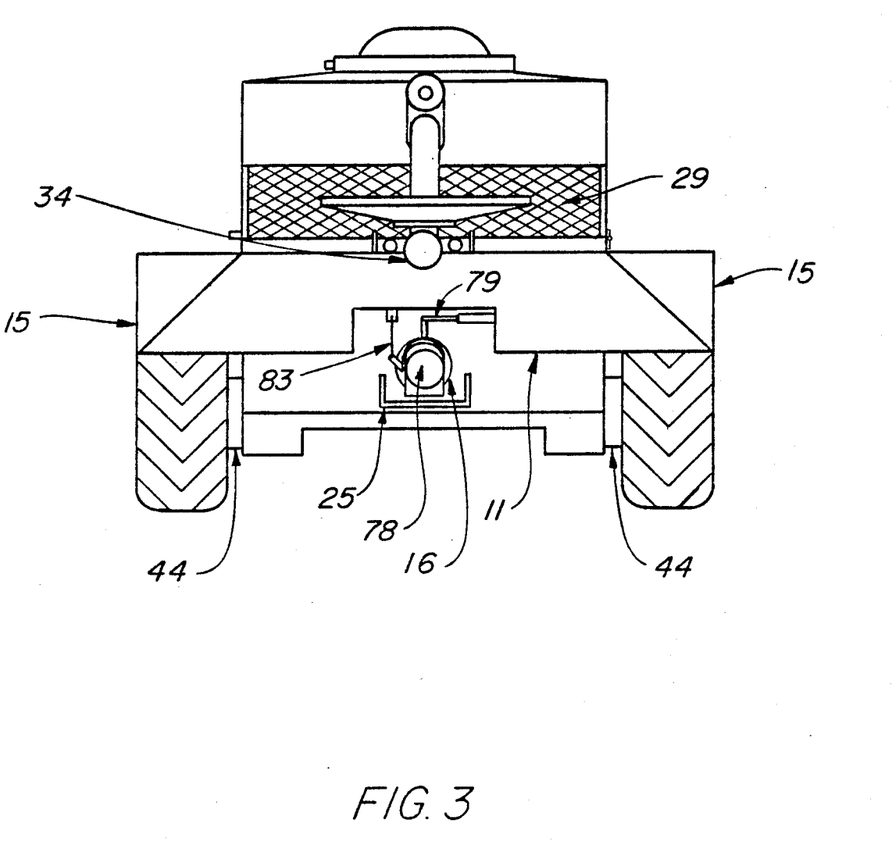
FIG. 3 is a rear view.

Referring to FIGS. 1, 2 and 3 there is shown to advantage my amphibious aquaculture feed distribution vehicle, generally described as 10. FIG. 1 is a side view, FIG. 2 a front view and FIG. 3 a rear view. Together these first three drawings show to advantage the various subassemblies which are described in greater detail later in this written description and in subsequent drawings.

Buoyancy is maintained by means of watertight hull 11 and side floatation tanks 15 as shown in FIGS. 1, 2 and 3. Wheels 17 are used for land propulsion, and jet pump assembly 16 is used for water propulsion. The operator control tower 12 is located forward and elevated to allow the vehicle operator an unobstructed 360° view when seated in seat 20.

Because of the harsh salt water environment that vehicle 10 is designed to work in, hull 11 and all other parts of the vehicle which can possibly come in contact with salt water are made of stainless steel, or if that is not feasible, then of galvanized steel. Side floatation tanks 15, being in exposed side positions, are also stainless steel, but have an additional feature of being filled with polyurethane so as to prevent loss of buoyancy in the event they are punctured. In less harsh environments, or in the event of required cost reduction, the vehicle can also be fabricated from aluminum or fiberglass.

Figure 9:
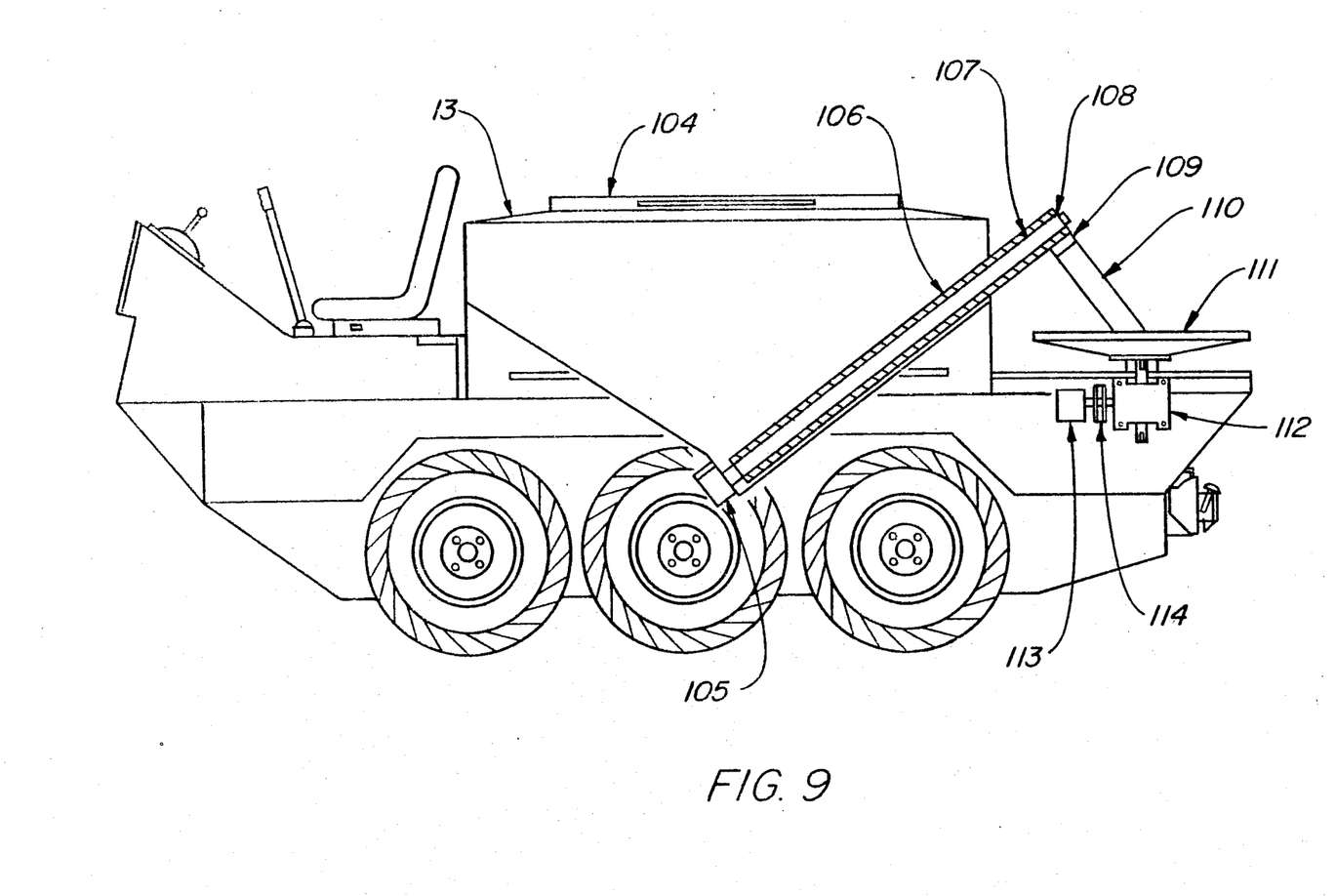
FIG. 9 is a representational view of the feed storage and distribution system.

Storage tank 13 is located in the central section of the vehicle and incorporates a portion of hull 11 as is shown in FIG. 9. Auger elevator assembly 14 extends up from the bottom of storage tank 13 and out to a location where augered feed or chemicals can be discharged into flexible drop chute 110 from where it is dropped onto centrifugal distributor 111.

The air intake screens 19, as shown in FIGS. 1 and 2 provide an inlet passage for air for purposes of ventilating the interior of the hull 11, which contains the engine, and also for both engine radiator cooling and combustion air. Engine exhaust and ventilation air are exhausted through air exhaust screen 29 located at the rear of storage tank 13 as shown in FIGS. 1 and 3.

Illumination for nighttime operations is provided by forward lights 21 and rear light 34 as shown in FIGS. 2 and 3. Watertight integrity at the points where wheel shafts 45 pass through hull 11 is maintained by clipper seals 22. Skid plate 25, as shown in FIGS. 1 and 3 protects the jet pump assembly 16.

Figure 4:
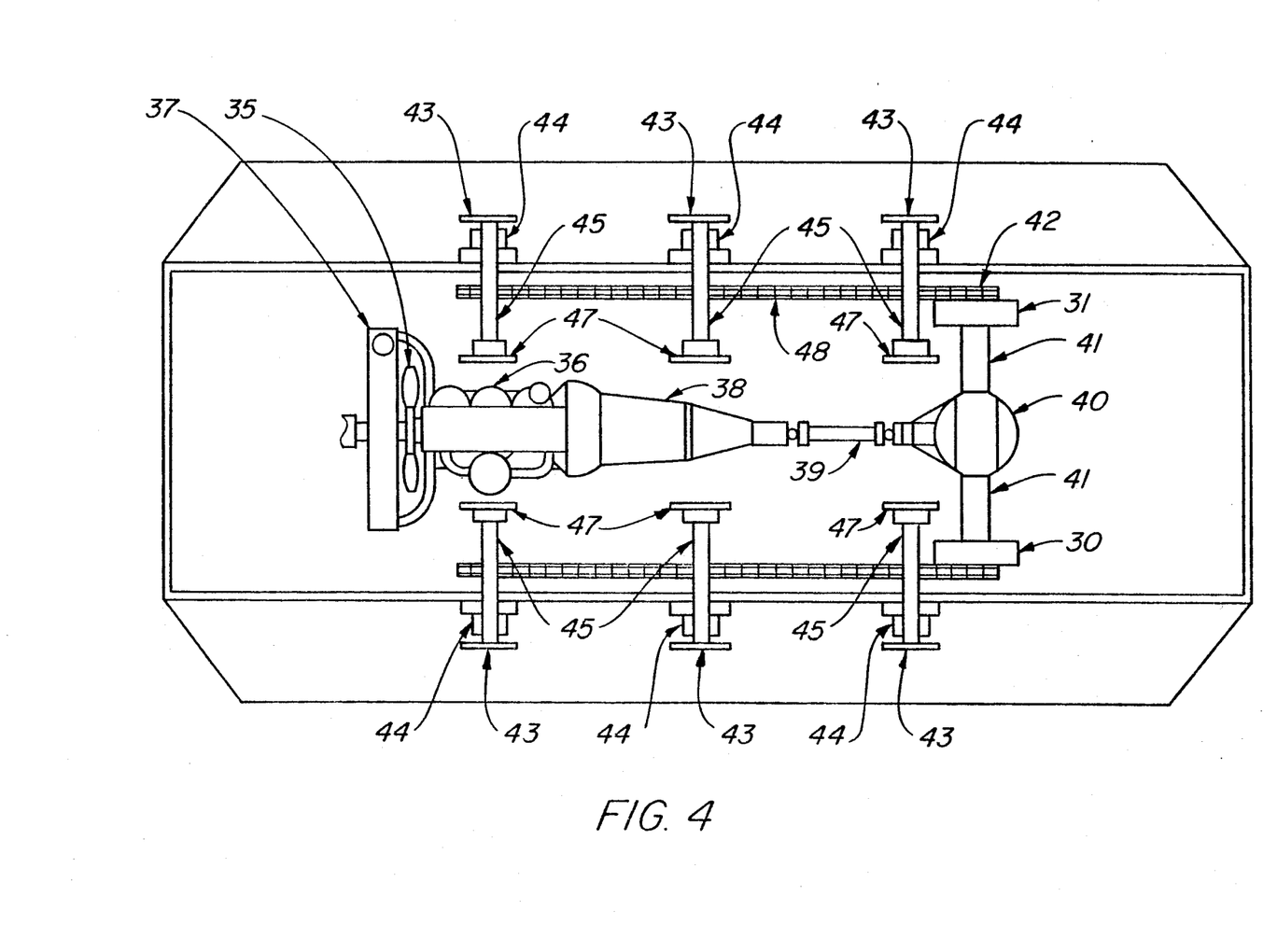
FIG. 4 is a representational top view of the land propulsion systems.
Figure 5:
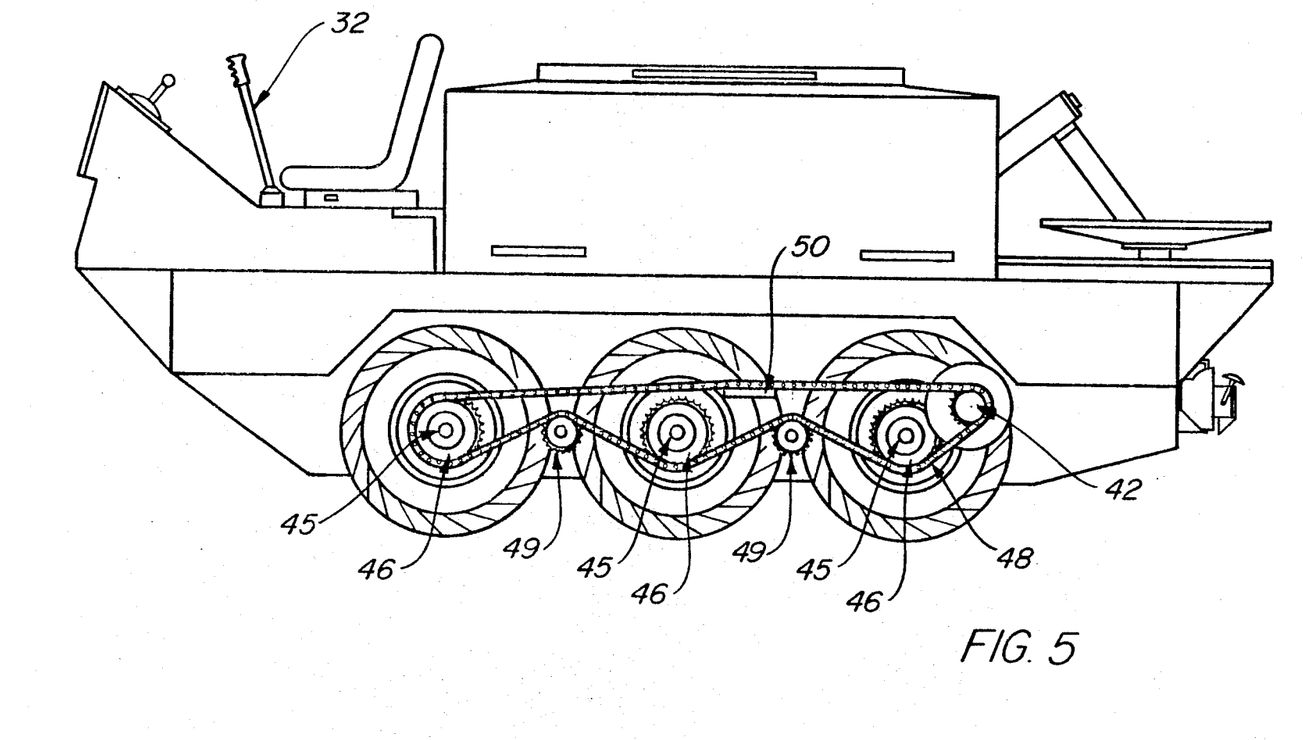
FIG. 5 is a representational side view of the land propulsion systems.

The mechanical layout of the land propulsion system is schematically depicted in FIGS. 4 and 5. Power is provided by engine 36 and transmitted through automatic transmission 38 to differential gear assembly 40 by means of drive shaft 39. Although it should be apparent that a manual transmission could be easily substituted for automatic transmission 38, in practice it has been found that an automatic transmission is more satisfactory since it simplifies operation of the vehicle. Also, it has been found in practice that standard automotive gas and diesel engines, transmissions and drive line components including differentials and drive shafts are entirely satisfactory for this intended use.

Each wheel 17 is attached to and supported on wheel shafts 45 by means of galvanized lug bolts, not shown, which are screwed into the threaded holes in wheel hubs 43 which are welded to wheel shafts 45. Wheel shafts 45 are mounted to hull 11, for free rotation by means of external bearing and seal assembly 44 and internal thrust bearing assemblies 47.

All three wheels 17, of each set of three wheels each, are simultaneously driven by means of drive chains 48. Power is transferred from differential gear assembly 40 to each side by an axle shaft, not shown, encased with axle housings 41. Attached to the end of each axle shaft is a spur gear herein identified as main drive gears 42. Attached to wheel shafts 45 by means of a flange mount are spur gears herein identified as wheel drive gears 46. Final gear reduction for land propulsion is accomplished by means of appropriately sizing main drive gears 42 and wheel drive gears 46. Drive chain 48 transmits power from drive gears 42 to wheel drive gears 46. Each drive chain is held under tension, and the open portion, or return portion of drive chain loop is held in position by means of idler gears 49 and slide plates 50.

In practice, and again because of the harsh salt water environment, it has been found advantageous to encase each wheel drive assembly of gears and drive chain by use of a metal casing and shaft seal assemblies. For the sake of clarity, the casings are not shown in the drawings, but it should be apparent to anyone skilled in the art that a standard casing may be constructed to enclose the drive gear assemblies.

In another embodiment, not shown in the drawings, the same land propulsion assembly could be used to drive a track assembly in lieu of pneumatic tires. This would be of significant usefulness in locations where road conditions are extremely poor or where access from land embankments is very steep.

Control of vehicle speed and direction in the land propulsion mode is accomplished by independent braking of the wheel sets on each side of the vehicle. Referring to FIGS. 4, 5, 8, 10 and 13, this control system is shown to advantage. Left brake assembly 30, and right brake assembly 31 are attached to each drive shaft assembly between the differential 40 and drive gears 42. These brake assemblies may be of either the disc or drum type, although in practice it has been found that drum brakes provide more control.

Figure 13:
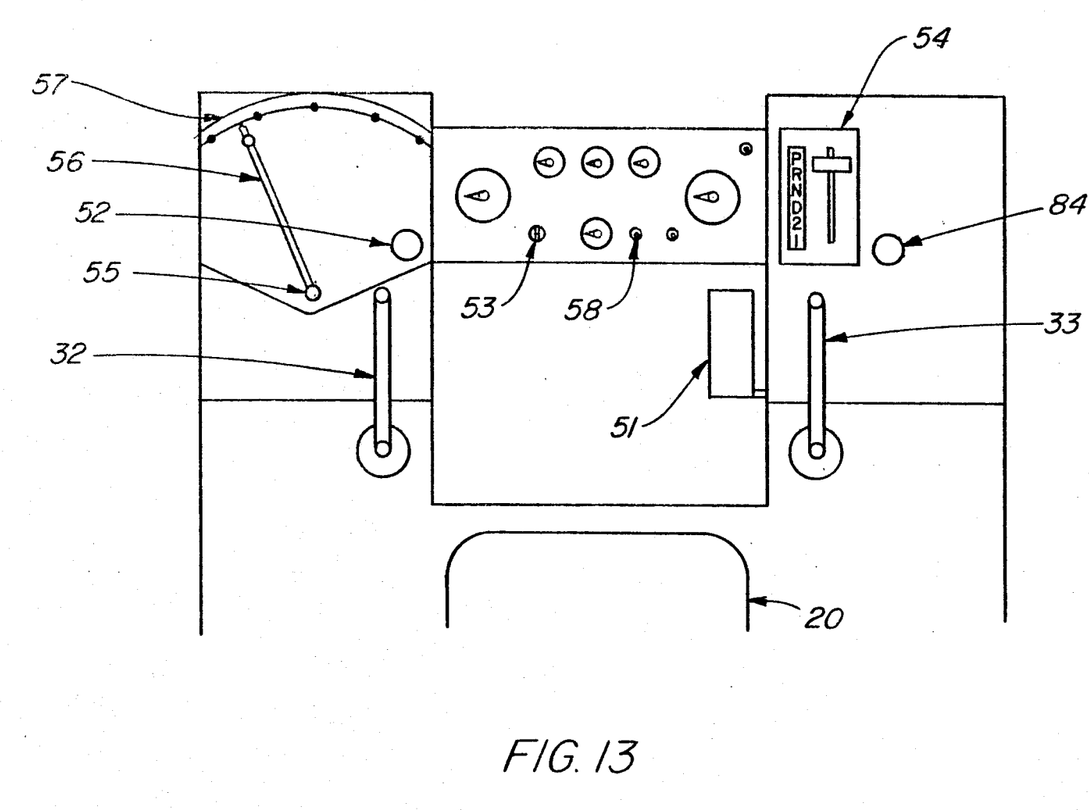
FIG. 13 is a representational view of the control panel and controls.

Engine speed is controlled, during land propulsion, by means of a conventional foot operated accelerator pedal 51 located on the floor of control tower 12 in the position where an operator would normally expect a vehicular accelerator pedal to be. The operator, seated in seat 20, will have before him accelerator pedal 51, hand throttle 52, ignition key assembly 53, transmission control 54, in addition to standard engine gauges including a speedometer, knot meter, fuel gauge, temperature and oil pressure gauges.

Figure 10:
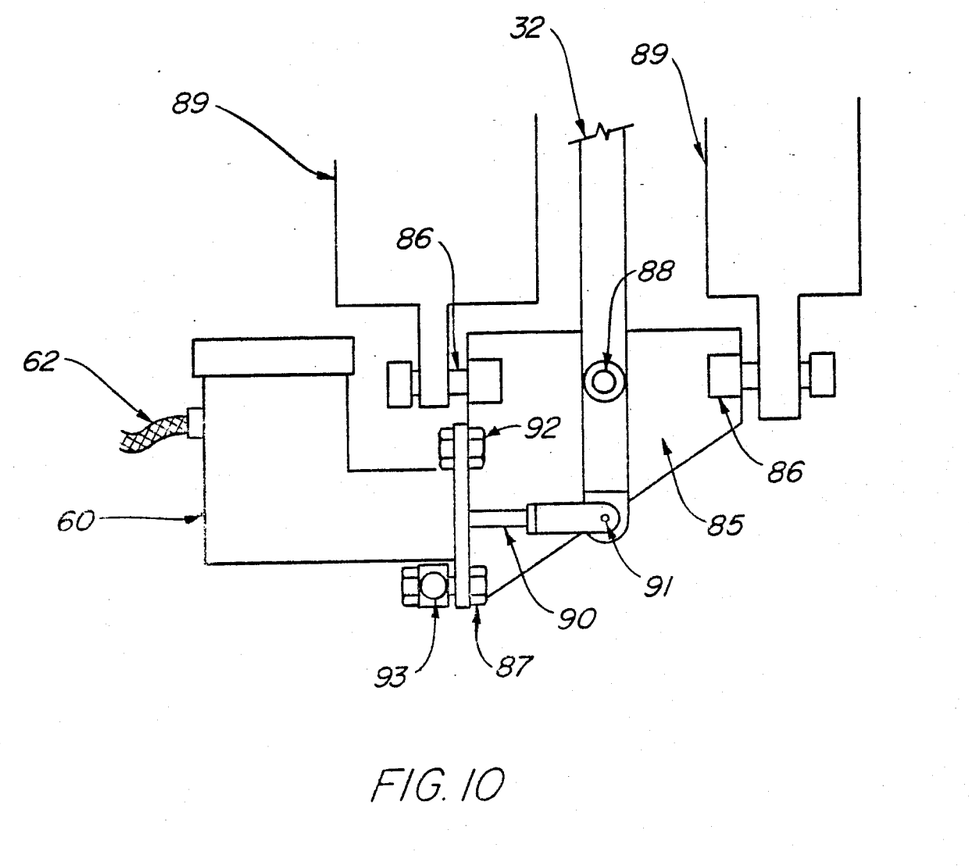
FIG. 10 is a representational side view of the brake and steering lever assembly.

Also, positioned to the sides of the operator's legs, in a location for convenient land operation are two control levers, identified as left control lever 32 and right control lever 33. Referring now to FIGS. 4, 10 and 13 the land propulsion control system is more fully explained. Both the left brake assembly 30 and right brake assembly 31 are independently hydraulically operated by separate hydraulic master brake cylinders which are connected to the appropriate control lever.

Figure 8:
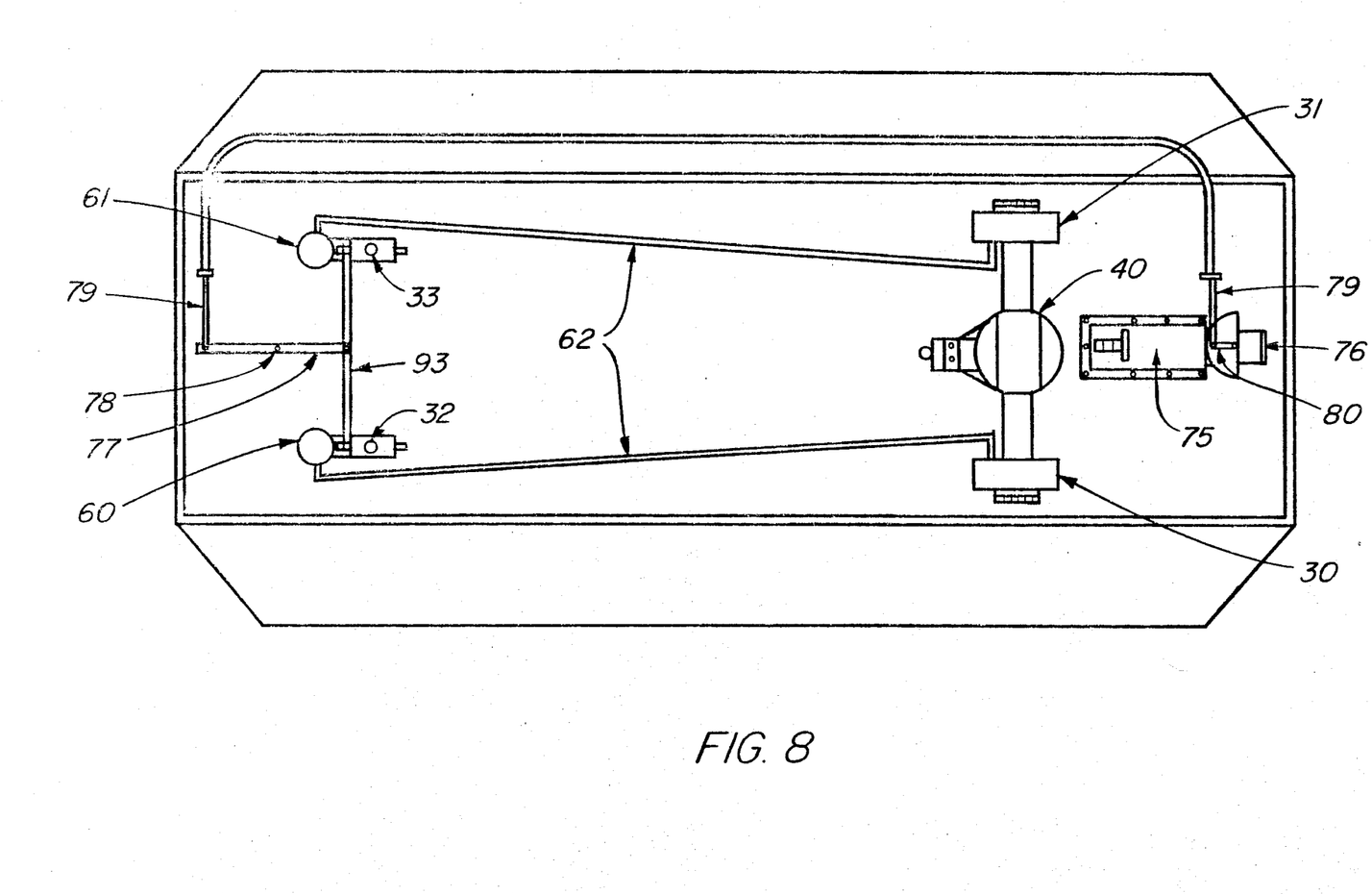
FIG. 8 is a bottom representational view of the combination brake and steering lever assembly.

Referring to FIGS. 8 and 10, the land propulsion control system is schematically represented. Attached to left control lever 32 is left master brake cylinder 60. In a similar manner right control lever 33 is operatively connected to right master brake cylinder 61. Both cylinders are, of course, operatively connected to the left and right brakes 30 and 31 respectively by means of flexible hydraulic lines 62.

If the operator, during land propulsion, desires to turn left, he merely pulls back on left control lever 32, thereby imparting compressive forces on the hydraulic fluid contained within left master cylinder 60. When this is done, left brake assembly 30 is actuated and the left drive shaft will slow. Differential 40 will then transfer power to the right side thus impairing rotational motion to the vehicle.

In a similar manner, pulling back on the right control lever 33 will turn the vehicle to the right. By letting off the accelerator and pulling back on both control levers simultaneously the operator may slow or stop the vehicle.

Figure 6:
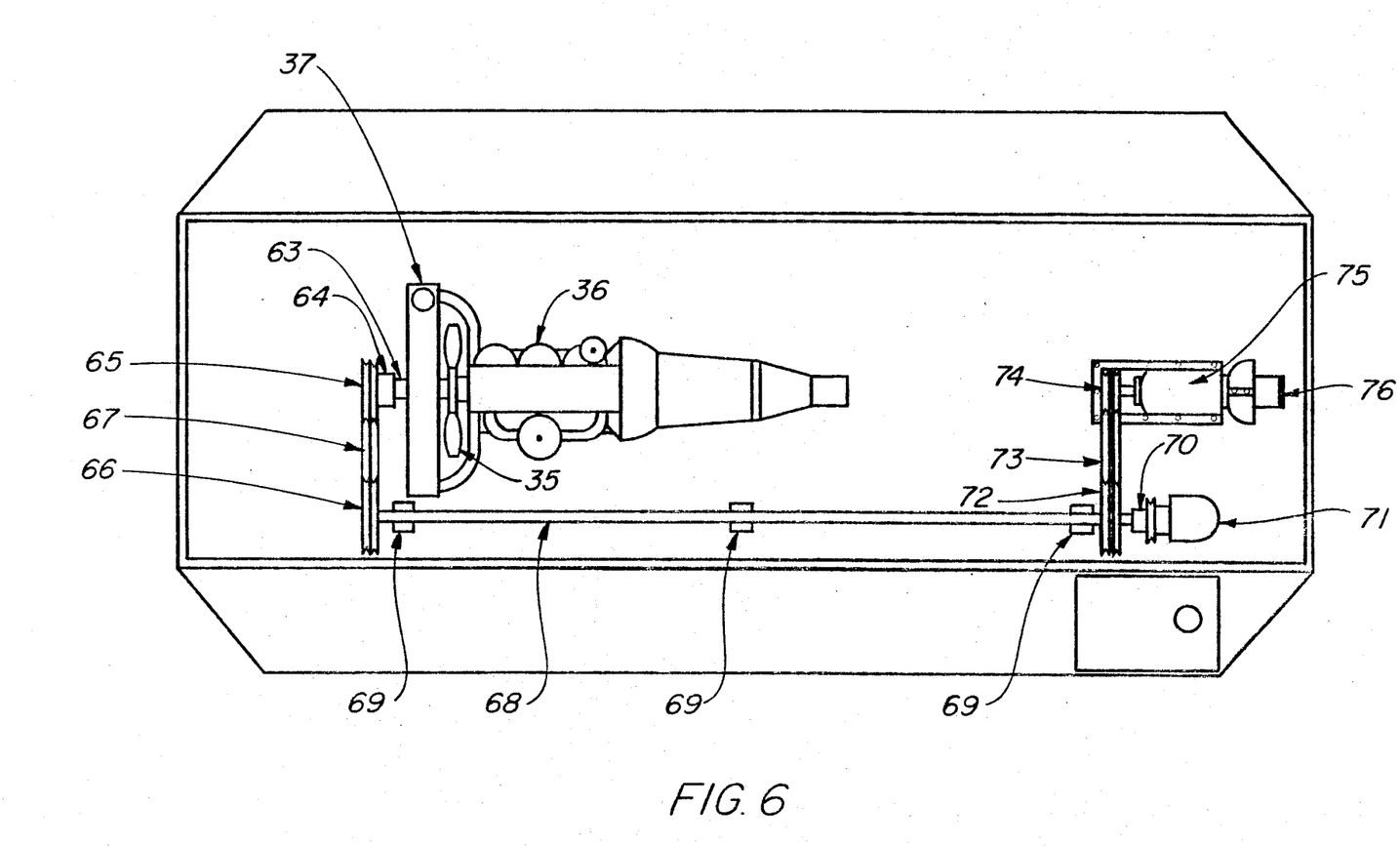
FIG. 6 is a representational top view of the water propulsion system.
Figure 7:
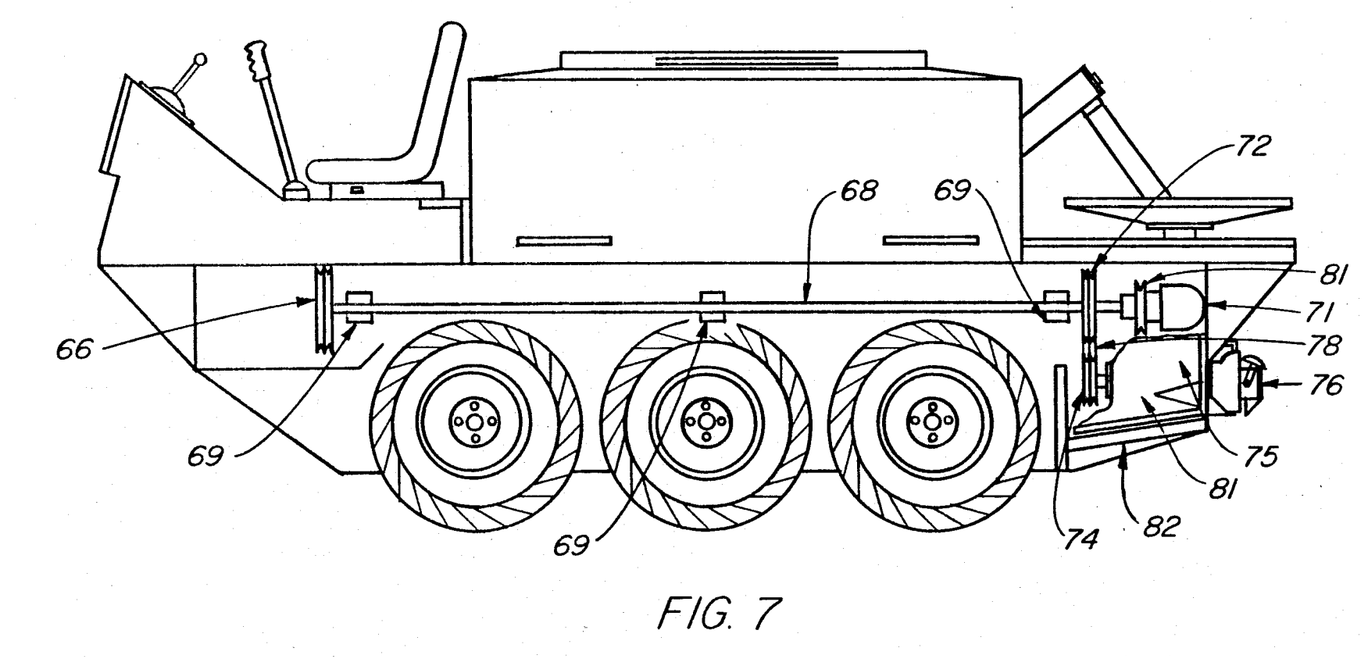
FIG. 7 is a representational side view of the water propulsion system.

The water propulsion system is shown to advantage in FIGS. 6, 7 and 8. It begins at engine 36 where stub shaft 63 extends out from fan assembly 35 through a hole in radiator 37. Magnetic clutch 64 is attached to shaft 63 and provides a method of selectively engaging power to the jet pump assembly and the feed distribution system.

Power is transferred from magnetic clutch 64 to auxiliary power shaft 68 by means of a first pulley assembly having double pulleys 65 and 66 connected by belts 67. Auxiliary shaft 68 is supported for rotational movement by bearings 69. Power is then transferred to jet pumps 75 by means of a second pulley assembly having double pulleys 72 and 74 and belts 73. It should be apparent that by varying the size of the pulleys, various speed adjustments can be made in the same manner as if gears were used, to obtain desired revolutions per minute for both auxiliary power shaft 68 and jet pump 75.

Engine throttle control for water operations is accomplished by means of lockable hand throttle 52.

Hydraulic pump 71 is also provided and attached to auxiliary power shaft 68 through hydraulic pump magnetic clutch 70. The hydraulic power provided by hydraulic pump 71 is used for operating various components of the feed distribution system which are discussed later in this specification.

Jet pump 75 is of standard design and is provided with two main control systems. The first is a directionally adjustable outlet nozzle 76 which can be directed to discharge water through an arc horizontal to the plane of the vehicle thereby determining the direction of thrust and the direction the vehicle will travel. The second is a reversing baffle, not shown, which causes thrust to be reversed and thus provides a means of slowing or moving the vehicle in reverse in water.

Referring to FIG. 7, jet pump 75 draws in water through intake duct 81 which is covered by screen 82. This is an important feature since the use of the jet pump eliminates external propellers which can damage marine life in the pond. Additionally intake duct 81 is oversized to reduce suction pressures at screen 82 to a safe level to prevent injury to marine life which may come in contact with screen 82.

Control features for the water propulsion system are shown in FIGS. 3, 8 and 10. The reversing baffle and the directional nozzle 76 are both controlled by cables operable from the control tower. Reversing cable 83, as shown in FIG. 3 is provided to insert the reversing thrust baffle into the stream of water being ejected from jet pump 75. Its control knob 84 is located at a convenient location on the control panel as shown in FIG. 13. To reverse thrust the operator merely pulls knob 84 out, to go forward again, he pushes it in.

Directional control of nozzle 76 is accomplished by the use of nozzle control cable 79 attached to nozzle control arm 80. By adjusting the position of nozzle control arm 80, the direction of nozzle 76 is changed hence the direction the vehicle will travel. A separate operator control system could easily be provided to adjust the position of control cable 79, but it is advantageous to make use of the same control levers, 32 and 33 which are used for the land propulsion system. Hence another important feature, as disclosed in FIGS. 8 and 10 has been developed.

Next, referring to FIG. 10 a sectional view of the lower end of control lever 32 is shown. It should be pointed out that the construction features for control lever 33 are identical to those shown for control lever 32.

Control lever 32 is pivotally mounted to subframe 85 by means of brake pivot pin 88 and is free to pivot fore and aft, relative to subframe 85, to thereby move brake cylinder piston rod 90, which is fastened to lever 32 by piston rod pin 91, into and out of master brake cylinder 60. Master brake cylinder 60 is also bolted by means of bolts 87 and 92 to subframe 85 and as a result there is no relative motion between the master cylinder 60 and control lever 32 other than the designed travel of brake piston rod 90.

However subframe 85 is itself pivotally mounted to control tower frame 89 by means of frame pivot pins 86, thus allowing for left and right pivoting motion of control lever 32. It can be seen in FIG. 8, in addition to FIG. 10, that cross member 93 connects the lowermost portions of the subframe assemblies of control levers 32 and 33 and provides for a convenient point for translation of the lateral pivotal motion of control levers 32 and 33 into a control system for nozzle 76. This is accomplished along with the necessary mechanical advantage for obtaining a full range of nozzle travel, by use of nozzle control pivot arm 77 and pivot arm pin 78 which is attached to the control tower frame.

It should be noted that while master brake cylinders 60 and 61 do not move relative to the control arms, there is some lateral motion induced by reason of the left and right movement of control arms 32 and 33 during water operations. However, as previously stated, hydraulic lines 62 are flexible and are provided with enough slack to compensate for this limited motion.

Storage tank 13 and auger assembly 14 as shown in FIG. 1 are also shown in a representational view in FIG. 9. Feed or chemicals are conveniently loaded into storage tank 13 through a large opening at the top which is then covered with storage tank cover 104. Auger screw 107, located within auger case 106 and supported for rotation on nylon bearing 108 is turned by auger hydraulic motor 105. Hydraulic motor 105 receives power from hydraulic pump 71, and speed is controlled by means of routing the hydraulic lines connecting the two through auger flow control valve 55 which is attached to feed flow pointer 56 located on the control tower as shown in FIG. 13. Feed flow gauge 57 is provided to work in conjunction with feed flow pointer 56 to give the operator an accurate indication as to the actual feed flow to distributor 111.

Feed carried by auger screw 107 exits auger case 106 through flange opening 109 and slides down flexible drop chute 110 to centrifugal distributor 111.

Figure 11:
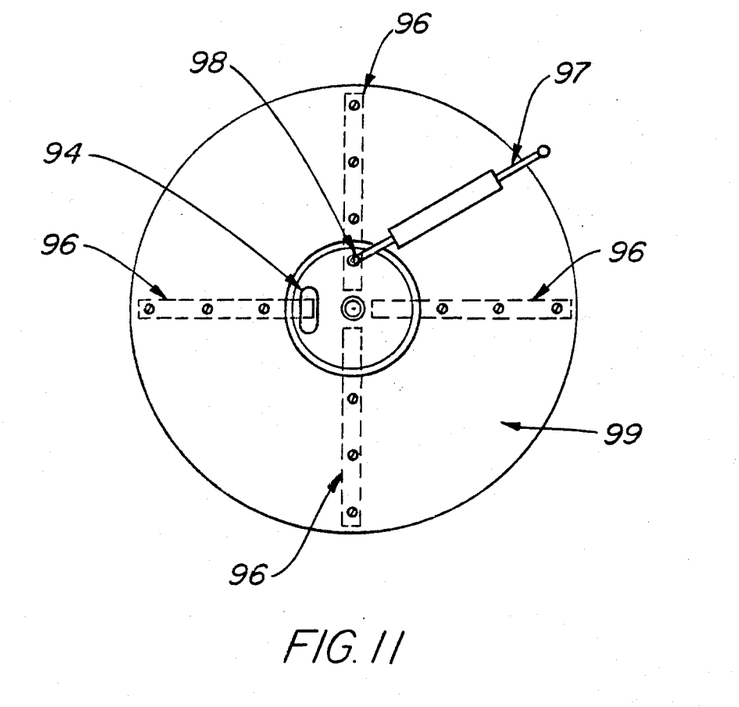
FIG. 11 is a representational top view of the distributor fan assembly.
Figure 12:
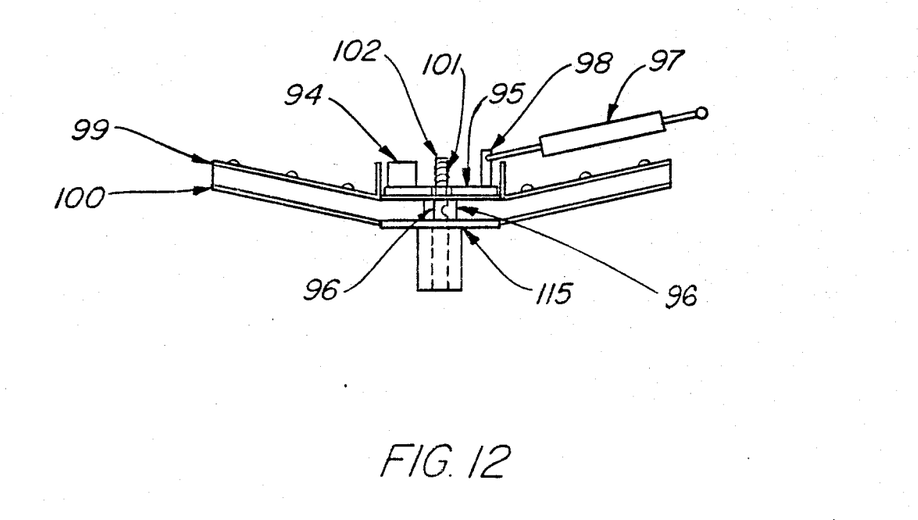
FIG. 12 is a representational side view of the distributor fan assembly.

As shown in FIGS. 11 and 12, feed sliding down the flexible drop chute 110 as shown in FIGS. 1,5,7, and 9 enters the receiving flange 94 which is a part of stationary disc 95 and into the path of the rotating distributor base 96. Stationary disc 95 is held stationary by adjustable turnbuckle 97 which is attached to the frame of the vehicle at one end, and to stationary disc 95 at the other by standing pivot rod 98.

By adjusting turnbuckle 97, the alignment of stationary disc 95 and receiving flange 94 can be changed relative to the distribution fan assembly. Flexible drop chute 110 is designed to allow reorientation of stationary disc 95 through a full 360° of arc. By doing so the operator can change the location of where the feed drops unto the distribution fan assembly and thus vary the pattern of feed being sprayed out over the water. This is especially useful in embodiments having more than one distributor fan and drop chute assemblies.

Stationary disc 95 is held down against rotating upper cone plate 99 by means of spring and collar 101 which are rotationally mounted to center rod 102 which rotates with the distributor assembly. Upper cone plate 99 and lower cone plate 100 are held together with bolts which pass through distributor bars 96.

The entire distributor assembly 111 is attached to distributor gear box 112 by hub 115, and rotated by the distributor gear box 112 which receives power from the hydraulic distributor motor 113 through the magnetic distributor clutch 114. The operator is provided with switch 58 at the control tower as shown in FIG. 13, with which he operates magnetic distributor clutch 114 to turn the distributor assembly 111 on and off.

It should also be noted that the number of additional alternative methods of the powering the distributor fan, which include the mechanical transfer of power from auxiliary power shaft 68 to distributor gear box 112 by means of pulley and belts or even gear and chain arrangements, as well as direct hydraulic drive with flow control valve as described for the auger assembly.

Not shown in this description are the other standard features of a hydraulic system such as the receiving tank, cooling radiator, hydraulic lines and the like which are well known in the art.

While there is shown and described the present preferred embodiment of the invention, it is to be distinctly understood that the invention is not limited thereto but may be variously embodied to practice within the scope of the following claims.

Accordingly, what I claim is:

1. An amphibious aquaculture feed and chemical distribution machine which comprises:

an amphibious vehicle for traveling upon both land and in both deep and shallow water;

means for storing feedstuffs within said amphibious vehicle;

feed distribution means for transferring said feed stuffs from the storage means, through the air to the surface of the water, an auger which transfers feed from the storage means to a plurality of drop chutes; a plurality of drop chutes which drops feed onto centrifugal distribution fans; a plurality of centrifugal distribution fan means which centrifugally disperses feedstuff or chemicals over an area of water.

2. The apparatus of claim 1 wherein said amphibious vehicle further comprises:

a watertight hull;

power generation means attached to said hull;

land propulsion means selectively, operatively, connected to the power generation means;

water propulsion means selectively, operatively, connected to the power generation means.

3. The apparatus of claim 2 wherein the watertight hull, land propulsion means and water propulsion means are made of corrosion resistant materials.

4. The apparatus of claim 3 wherein said corrosion resistant materials are stainless steel and galvanized steel.

5. The apparatus of claim 4 wherein said storage means is a tank disposed within said amphibious vehicle hull and attached to said hull frame.

6. The apparatus of claim 3 wherein said corrosion resistant materials are aluminum.

7. The apparatus of claim 6 wherein said storage means is a tank disposed within said amphibious vehicle hull and attached to said hull frame.

8. The apparatus of claim 3 wherein said corrosion resistant materials are fiberglass.

9. The apparatus of claim 8 wherein said storage means is a tank disposed within said amphibious vehicle hull and attached to said hull frame.

10. The apparatus of claim 2 wherein said power generation means further comprises:

a gasoline powered engine;

throttle control means operatively connected to said gasoline engine.

11. The apparatus of claim 7 wherein said throttle control means further includes:

a foot operated, throttle pedal for controlling engine speed when traveling upon land;

spring biasing means for returning the foot throttle to its idle speed position when the operator removes his foot;

an adjustably lockable hand throttle for controlling engine speed when traveling upon water.

12. The apparatus of claim 10 wherein said power generation means further comprises a hydraulic pump operatively connected to said engine.

13. The apparatus of claim 2 wherein said power generation means further comprises:

a diesel powered engine;

throttle control means operatively connected to said diesel engine.

14. The apparatus of claim 13 wherein said throttle control means further includes:

a foot operated, throttle pedal for controlling engine speed when traveling upon land;

spring biasing means for returning the foot throttle to its idle speed position when the operator removes his foot;

an adjustably lockable hand throttle for controlling engine speed when traveling upon water.

15. The apparatus of claim 13 wherein said power generation means further comprises a hydraulic pump operatively connected to said engine.

16. The apparatus of claim 2 wherein said land propulsion means further comprises:

a transmission having a plurality of manually selectable gear ratios;

clutch means for selectively transmitting power from the power generation means to the transmission;

a differential gear assembly, operatively connected to the transmission;

said differential assembly having at least one right side power output shaft and one left side power output shaft;

at least two left side pneumatic tires and two right side pneumatic tires, each rotatably attached to the hull;

means for operatively connecting the left side power output shaft to the left side tires for imparting rotational movement thereto;

means for operatively connecting the right side power output shaft to the right side tires for imparting rotational movement thereto;

directional control means having at least one selectively operable brake operatively connected to left side power output shaft and at least one selectively operable brake operatively connected to the right side power output shaft;

means for selectively operating said left and right brakes.

17. The apparatus of claim 16 wherein said left and right brakes and means for selectively operating said left and right brakes further comprise:

brake assemblies each having rotors attached to the left and right output shafts for axial rotation therewith and brake pads for frictional engagement therewith, said brake pads being connected to hydraulically operated calipers rigidly attached to the hull;

a pair of brake control levers each operatively connected to an independent brake master cylinder for generation of hydraulic pressure;

a pair of independent brake master cylinders each operatively connected to a hydraulically operative brake caliper.

18. The apparatus of claim 2 wherein said land propulsion means further comprises:

an automatic transmission having a plurality of selectable gear ratios;

a differential gear assembly, operatively connected to the transmission;

said differential assembly having at least one right side power output shaft and one left side power output shaft;

at least two left side pneumatic tires and two right side pneumatic tires, each rotatably attached to the hull;

means for operatively connecting the left side power output shaft to the left side tires for imparting rotational movement thereto;

means for operatively connecting the right side power output shaft to the right side tires for imparting rotational movement thereto;

directional control means having at least one selectively operable brake operatively connected to left side power output shaft and at least one selectively operable brake operatively connected to the right side power output shaft;

means for selectively operating said left and right brakes.

19. The apparatus of claim 2 wherein said land propulsion means further comprises:
   a transmission having a plurality of manually selectable gear ratios;
   clutch means for selectively transmitting power from the power generation means to the transmission;
   a differential gear assembly, operatively connected to the transmission;
   said differential assembly having at least one right side power output shaft and one left side power output shaft;
   a left track assembly rotatably attached to the hull;
   a right track assembly rotatably attached to the hull;
   means for operatively connecting the left side power output shaft to the left track assembly for imparting rotational movement thereto;
   means for operatively connecting the right side power output shaft to the right track assembly for imparting rotational movement thereto;
   directional control means having at least one selectively operable brake operatively connected to the left side power output shaft and at least one selectively operable brake operatively connected to the right side power output shaft;
   means for selectively operating said left and right brakes.

20. The apparatus of claim 2 wherein said land propulsion means further comprises:
   an automatic transmission having a plurality of selectable gear ratios;
   a differential gear assembly, operatively connected to the transmission;
   said differential assembly having at least one right side power output shaft and one left side power output shaft;
   a left track assembly rotatably attached to the hull;
   a right track assembly rotatably attached to the hull;
   means for operatively connecting the left side power output shaft to the left track assembly for imparting rotational movement thereto;
   means for operatively connecting the right side power output shaft to the right track assembly for imparting rotational movement thereto;
   directional control means having at least one selectively operable brake operatively connected to the left side power output shaft and at least one selectively operable brake operatively connected to the right side power output shaft;
   means for selectively operating said left and right brakes.

21. The apparatus of claim 2 wherein said water propulsion means further comprises:
   a jet pump operatively connected to the power generation means;
   means for controlling the direction of the thrusting force generated by said jet pump.

22. The apparatus of claim 21 wherein said jet pump further comprises:
   a water jet pump operatively connected to the power generation means pump;
   a jet pump discharge manifold connected to the discharge of said water jet pump;
   a jet pump suction manifold connected to the inlet of said water pump;
   a screen covering the inlet of the suction manifold for prohibiting the introduction of marine life into the suction manifold;
   said suction manifold being of an enlarged size so as to reduce the suction vacuum pressure below the threshold wherein it would do damage to marine life passing next to the suction screen.

23. The apparatus of claim 2 wherein said amphibious vehicle further comprises a left stabilization buoyancy tank and a right stabilization buoyancy tank attached to the left and right side of the hull.

24. The apparatus of claim 1 wherein said storage means is a tank disposed within said amphibious vehicle hull and attached to said hull frame.

25. The apparatus of claim 1 wherein said feed or chemicals distribution means further comprises:
   an auger for transferring feed from the storage means to a drop chute;
   a drop chute for dropping feed onto a centrifugal distribution fan;
   a centrifugal distribution fan means for centrifugally disbursing feedstuff or chemicals over an area of water.

26. The apparatus of claim 25 wherein said feed distribution means further comprises a means for controlling the amount of feed disbursed.

27. The apparatus of claim 26 wherein said control means further include:
   a hydraulic motor operatively connected to the auger;
   a hydraulic pump operatively connected to said hydraulic motor;
   control means for controlling the rotational speed of the hydraulic motor.

* * * * *